United States Patent
Gilbert et al.

(10) Patent No.: US 10,095,773 B1
(45) Date of Patent: Oct. 9, 2018

(54) PROCESSING A SOCIAL ENDORSEMENT FOR AN ITEM

(71) Applicant: Google LLC, Mountain View, CA (US)

(72) Inventors: Evan Mallory Gilbert, Oakland, CA (US); Daniel Wesley Dulitz, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 93 days.

(21) Appl. No.: 15/293,233

(22) Filed: Oct. 13, 2016

Related U.S. Application Data (63) Continuation of application No. 14/207,366, filed on Mar. 12, 2014, now abandoned.

(60) Provisional application No. 61/780,907, filed on Mar. 13, 2013.

(51) Int. Cl.
  *G06F 17/30* (2006.01)
  *H04L 29/08* (2006.01)

(52) U.S. Cl.
  CPC .. *G06F 17/30598* (2013.01); *G06F 17/30312* (2013.01); *G06F 17/30864* (2013.01); *G06F 17/30896* (2013.01); *H04L 67/02* (2013.01)

(58) Field of Classification Search
  CPC ......... G06F 17/30598; G06F 17/30312; G06F 17/30386; G06F 17/2247; G06F 17/30286; G06F 17/30595; G06F 17/3071; G06F 17/30864; G06F 17/30896; G06Q 30/0245; G06Q 30/0251; G06Q 30/0279; G06Q 30/0631; G06Q 30/0641; H04L 67/02

USPC ....... 707/609, 625, 737, 755, 758, 802, 804, 707/805, 811; 705/1.1, 14.19, 14.2, 705/14.26, 14.44, 14.6, 26.7, 319, 322, 705/329
See application file for complete search history.

(56) References Cited

U.S. PATENT DOCUMENTS

| | | | | |
|---|---|---|---|---|
| 8,060,463 B1 * | 11/2011 | Spiegel | ................. | G06Q 30/02 707/609 |
| 2004/0148201 A1 * | 7/2004 | Smith | .................... | G06Q 10/10 705/4 |
| 2008/0288982 A1 * | 11/2008 | Pronk | ................. | H04N 21/4147 725/46 |
| 2010/0223119 A1 * | 9/2010 | Klish | .................... | G06Q 10/00 705/14.26 |
| 2010/0332312 A1 * | 12/2010 | Klinger | ................. | G06Q 10/10 705/14.43 |

(Continued)

Primary Examiner — Greta L Robinson
(74) Attorney, Agent, or Firm — Lowenstein Sandler LLP (57) ABSTRACT

A system and machine-implemented method for processing a social endorsement for an item. Structured data for a first item is received in association with a first webpage, the structured data for the first item defining properties of the first item that are specific to the first item. An indication of a social endorsement for the first item is received in association with the first webpage. In response to receiving the indication of the social endorsement, an item element corresponding to the first item is identified within a data structure. The data structure stores plural item elements, each item element including a description of the item and social endorsement information associated with the item. The social endorsement information associated with the identified item element is updated within the data structure, based on the received indication of the social endorsement for the first item.

20 Claims, 4 Drawing Sheets

(56) References Cited

U.S. PATENT DOCUMENTS

| | | | |
|---|---|---|---|
| 2012/0101806 A1* | 4/2012 | Davis | G06Q 30/02 |
| | | | 704/9 |
| 2012/0123858 A1* | 5/2012 | Rosenthal | G06Q 30/0251 |
| | | | 705/14.49 |
| 2012/0150592 A1* | 6/2012 | Govrik | G06Q 30/0207 |
| | | | 705/14.1 |
| 2012/0191776 A1* | 7/2012 | Ruffner | G06F 17/30873 |
| | | | 709/204 |
| 2013/0346877 A1* | 12/2013 | Borovoy | H04L 65/403 |
| | | | 715/753 |
| 2014/0089134 A1* | 3/2014 | Linh | G06Q 30/0282 |
| | | | 705/26.7 |

* cited by examiner

FIG. 4 under 35 U.S.C. § 120 as a continuation of U.S. patent application Ser. No. 14/207,366, entitled "PROCESSING A SOCIAL ENDORSEMENT FOR AN ITEM," filed Mar. 12, 2014 which claims priority benefit under 35 U.S.C. 119(e) from U.S. Provisional Patent Application Ser. No. 61/780,907, entitled "PROCESSING A SOCIAL ENDORSEMENT FOR AN ITEM," filed on Mar. 13, 2013, both of which are hereby incorporated by reference in their entirety for all purposes.

BACKGROUND

The present disclosure generally relates to online social endorsements and, in particular, to processing a social endorsement for an item.

Some internet services, such as social networking sites, Internet forums, news websites and blogs, include an endorsement interface which allows a user to provide a social endorsement for certain content provided by the internet service. The content corresponds to a specific webpage (e.g., a link to an article, online post, image, video, audio file, or type of other content). The endorsement interface can be displayed next to its associated content.

SUMMARY

The disclosed subject matter relates to machine-implemented of processing a social endorsement for an item. The method comprises receiving, in association with a first webpage, structured data for a first item, the structured data for the first item defining properties of the first item that are specific to the first item. The method further comprises receiving, in association with the first webpage, an indication of a social endorsement for the first item, and identifying within a data structure, and in response to receiving the indication of the social endorsement, an item element corresponding to the first item, wherein the data structure stores plural item elements, each item element including a description of the item and social endorsement information associated with the item. The method further comprises updating, within the data structure, the social endorsement information associated with the identified item element, based on the received indication of the social endorsement for the first item, receiving, in association with a second webpage, structured data for a second item, the structured data for the second item defining properties of the second item that are specific to the second item, and receiving, in association with the second webpage, an indication of a social endorsement for the second item. The method further comprises determining, based on the structured data for the second item, and in response to receiving the indication of the social endorsement for the second item, that the second item corresponds to the identified item element corresponding to the first item, and updating, within the data structure, the social endorsement information associated with the identified item element based on the received indication of the social endorsement for the second item.

The disclosed subject matter further relates to a machine-implemented method of processing a social endorsement for an item. The method comprises receiving, in association with a first webpage, structured data for a first item, the structured data for the first item defining properties of the first item that are specific to the first item, and receiving, in association with the first webpage, an indication of a social endorsement for the first item. The method further comprises identifying within a data structure, and in response to receiving the indication of the social endorsement, an item element corresponding to the first item, wherein the data structure stores plural item elements, each item element including a description of the item and social endorsement information associated with the item, and updating, within the data structure, the social endorsement information associated with the identified item element, based on the received indication of the social endorsement for the first item.

These and other embodiments can comprise one or more of the following features. The identifying can comprise comparing the description of the item included within the item element with the structured data for the first item, and determining, based on the comparison, that the item element meets a threshold comparison value with the first item. The method can further comprise receiving, in association with a second webpage, structured data for a second item, the structured data for the second item defining properties of the second item that are specific to the second item, receiving, in association with the second webpage, an indication of a social endorsement for the second item, determining, based on the structured data for the second item, and in response to receiving the indication of the social endorsement for the second item, that the second item corresponds to the identified item element corresponding to the first item, and updating, within the data structure, the social endorsement information associated with the identified item element based on the received indication of the social endorsement for the second item. The structured data for the first item and the structured data for the second item may not be identical to each other. The determining can comprise using a clustering algorithm based on the structured data for the second item and at least one of the structured data for the first item or the description of the item included within the item element, to determine that the second item corresponds to the identified item element corresponding to the first item. The first webpage can be configured to display a representation of the first item together with a user interface for socially endorsing the first item. The receiving the indication of the social endorsement can be based on user input via the user interface. The representation of the first item can be based on the structured data for the first item. The method can further comprise providing a representation of the social endorsement information for display within the first webpage. The method can further comprise receiving, in association with the first web page, a request for the social endorsement information, wherein the providing the representation for display within the first webpage is in response to the received request. The method can further comprise providing a representation of the social endorsement information for display in association with a user profile of a social networking service. The structured data for the first item can comprise at least one of a brand name or a model number for the first item. The structured data can be defined by one or more HTML attributes of the first webpage. The indication of the social endorsement can be received from log data which comprises annotations for user interactions associated with the first webpage. The indication of the social endorsement can be received in real-time for the first webpage.

The disclosed subject matter also relates to system for processing a social endorsement for an item. The system comprises one or more processors, and a machine-readable medium comprising instructions stored therein, which when executed by the processors, cause the processors to perform operations comprising receiving, in association with a first webpage, structured data for a first item, the structured data for the first item defining properties of the first item that are specific to the first item, wherein the structured data is defined by one or more HTML attributes of the first webpage. The operations further comprise receiving, in association with the first webpage, an indication of a social endorsement for the first item, and identifying within a data structure, and in response to receiving the indication of the social endorsement, an item element corresponding to the first item, wherein the data structure stores plural item elements, each item element including a description of the item and social endorsement information associated with the item. In addition, the operations comprise updating, within the data structure, the social endorsement information associated with the identified item element, based on the received indication of the social endorsement for the first item.

These and other embodiments can comprise one or more of the following features. The identifying can comprise comparing the description of the item included within the item element with the structured data for the first item, and determining, based on the comparison, that the item element meets a threshold comparison value with the first item. The first webpage can be configured to display a representation of the first item together with a user interface for socially endorsing the first item. The receiving the indication of the social endorsement can be based on user input via the user interface.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, some internet services include an endorsement interface (e.g., an "endorse" button) which allows a user to provide a social endorsement for certain content provided by the internet service. As used herein, a "social endorsement" refers to an indication, input by a user (e.g., via an interface), that the user likes, endorses or otherwise acknowledges the content.

An internet service can log the social endorsements for each piece of content (e.g., each specific website). The log data can include, but is not limited to, an identification of the content (e.g., the website link), identifications of the users (e.g., via a user profile within a social networking service) who socially endorsed the content, and the times that the content was endorsed (e.g., timestamps). In addition, the log data can include a total number of times that each piece of content was endorsed.

However, some internet services can refer to items which do not correspond to a specific website. For example, an online shopping service can display multiple items (e.g., products such as cameras or computers) which are not individually tied to specific webpages.

The subject disclosure provides for processing a social endorsement for an item. Structured data for a first item is received in association with a first webpage, the structured data for the first item defining properties of the first item that are specific to the first item. As used herein, "structured data" is data that resides in fields within a record or file, and specifies properties of an item. An indication of a social endorsement for the first item is received in association with the first webpage. In response to receiving the indication of the social endorsement, an item element corresponding to the first item is identified within a data structure. The data structure stores plural item elements, each item element including a description of the item and social endorsement information associated with the item. The social endorsement information associated with the identified item element is updated within the data structure, based on the received indication of the social endorsement for the first item.

In example aspects, structured data for a second item can also be received in association with a second webpage, the structured data for the second item defining properties of the second item that are specific to the second item. An indication of a social endorsement for the second item can be received in association with the second webpage. Based on the structured data for the second item, and in response to receiving the indication of the social endorsement for the second item, a determination can be made that the second item corresponds to the identified item element corresponding to the first item. The determination can be made using a clustering algorithm based on the structured data for the second item and at least one of the structured data for the first item or the description of the item included within the item element. The social endorsement information associated with the identified item element can be updated within the data structure, based on the received indication of the social endorsement for the second item.

Figure 1:
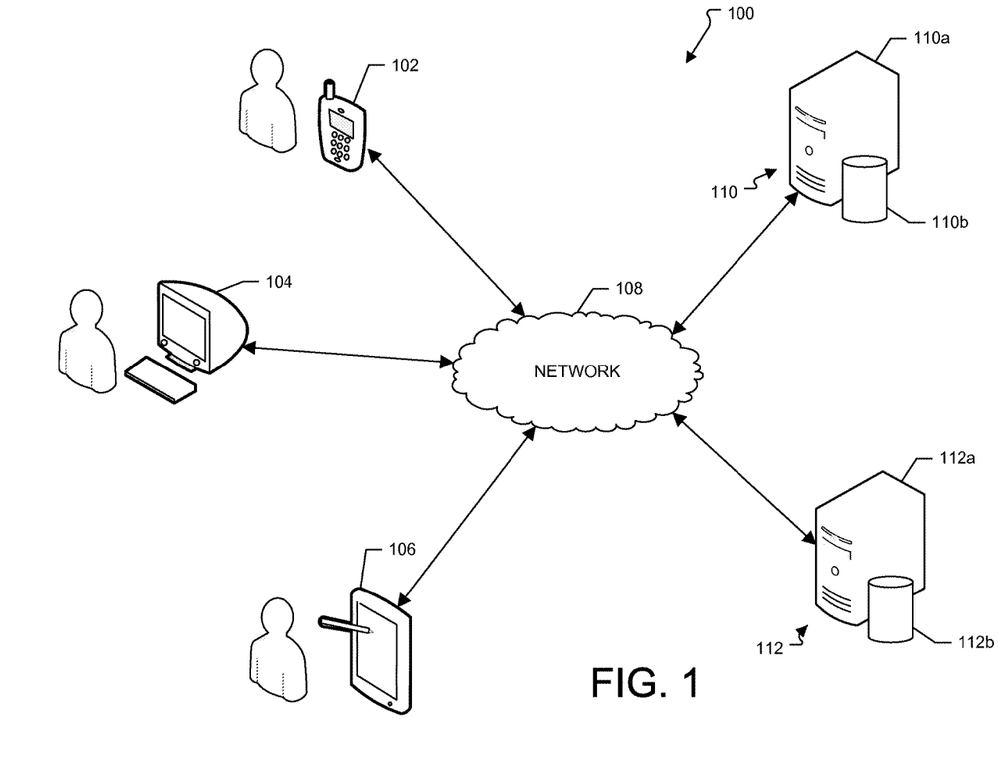
FIG. 1 illustrates an example network environment which provides for processing a social endorsement for an item.

FIG. 1 illustrates an example network environment which provides for processing a social endorsement for an item. A network environment 100 includes computing devices 102, 104 and 106 and computing systems 110 and 112. Computing devices 102-106 and computing systems 110-112 can communicate with each other through a network 108. Each of computing systems 110-112 can include one or more computing devices 110a-112a (e.g., one or more servers), respectively, and one or more computer-readable storage devices 110b-112b (e.g., one or more databases), respectively.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 110a-112a may be provided access to or receive application software executed or stored on any of the other computing systems 102-106 and 110a-112a.

Each of computing devices 110a-112a may be any system or device having a processor, a memory, and communications capability for providing content to the electronic devices. In some example aspects, each of servers 110-112 can be a single computing device, for example, a computer server. In other embodiments, each of servers 110-112 can represent more than one computing device working together to perform the actions of a server computer (e.g., cloud computing). Further, each of computing devices 110a-112a can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., servers 110-112) can occur via a virtual private network (VPN), Secure Shell (SSH) tunnel, or other secure network connection. In some aspects, network 108 may further include a corporate network (e.g., intranet) and one or more wireless access points.

In example aspects, processing device 110a executes computer instructions stored in data store 110b, for example, to host a website. Examples of a website hosted by server 110 include, but are not limited to, a social networking service, a search engine, an ecommerce site a content site (e.g., a news website), a forum site or a blog. The website hosted by server 110 can allow a user to socially endorse an item. For example, the website can include a user interface (e.g., an "endorse" button) for a user to enter social endorsements for items displayed in the website. In example aspects, social endorsements can be primarily associated with a first website (e.g., a social networking service), and one or more second websites (e.g., ecommerce site, content site) can include interfaces for effecting social endorsements in association with the first website (e.g., for a user profile in a social networking service).

In this regard, and in example aspects, processing device 112a executes computer instructions stored in data store 112b, for example, to process social endorsements from one or more websites. For example, server 112 receives, in association with a first webpage (e.g., for a website hosted by server 110), structured data for a first item, the structured data for the first item defining properties of the first item that are specific to the first item. Server 112 receives, in association with the first webpage, an indication of a social endorsement (e.g., via a user interface for socially endorsing the item) for the first item. In response to receiving the indication of the social endorsement, server 112 identifies an item element corresponding to the first item within a data structure (e.g., stored within data store 112b). The data structure (e.g., stored within data store 112b) stores plural item elements, each item element including a description of the item and social endorsement information associated with the item. Server 112 updates, within the data structure, the social endorsement information associated with the identified item element, based on the received indication of the social endorsement for the first item.

In further example aspects, server 112 can process a social endorsement from a second webpage, for a website hosted by a different server (not shown). For example, server 112 receives, in association with the second webpage, structured data for a second item, the structured data for the second item defining properties of the second item that are specific to the second item. Server 112 receives, in association with the second webpage, an indication of a social endorsement for the second item. In response to receiving the indication of the social endorsement for the second item, server 112 determines that the second item corresponds to the identified item element corresponding to the first item (e.g., using a clustering algorithm), based on the structured data for the second item. In addition, server 112 updates, within the data structure, the social endorsement information associated with the identified item element based on the received indication of the social endorsement for the second item.

Figure 2:
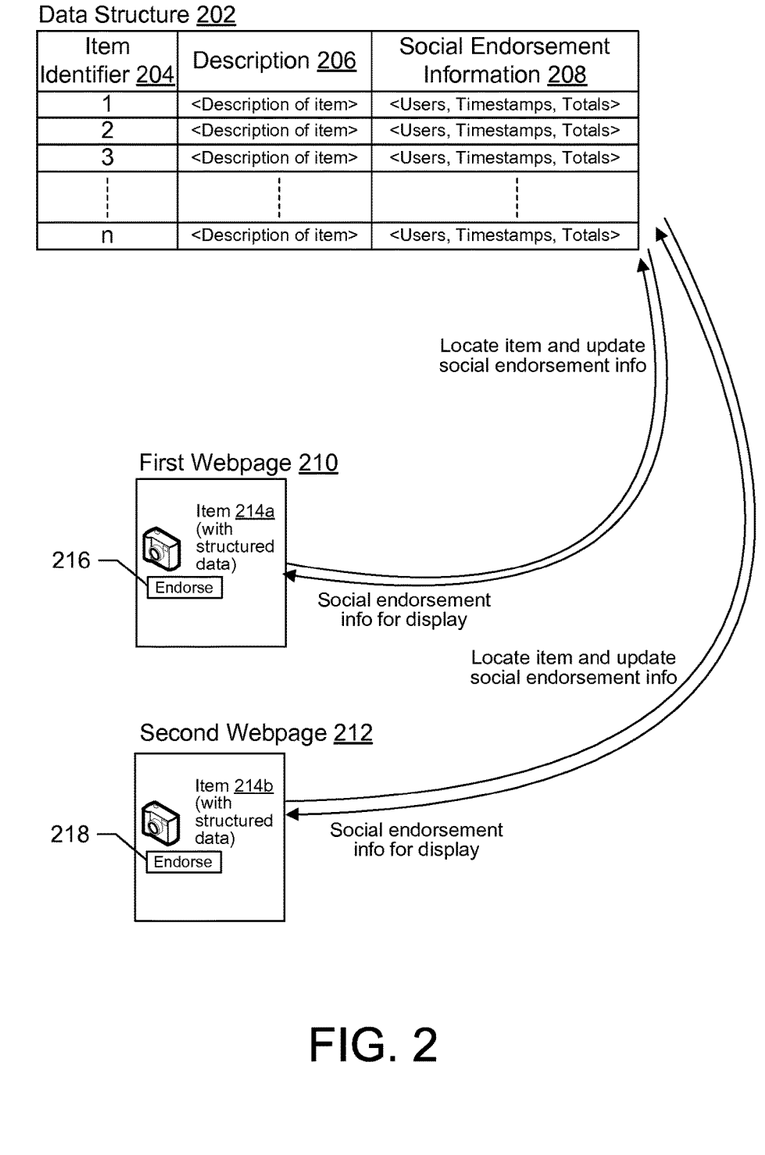
FIG. 2 is a block diagram illustrating an example of processing a social endorsement for an item from different webpages.

FIG. 2 is a block diagram illustrating an example of processing a social endorsement for an item from different webpages. As can be seen in FIG. 2, a data structure 202 includes an item identifier column 204, a description column 206 and social endorsement information column 208 for each of plural items.

In the example of FIG. 2, each of a first webpage 210 and a second webpage 212 can provide a representation of a similar item (e.g., items 214a and 214b, respectively). For example, the representation of the item can include, but is not limited to, one or more of a picture of the item, a name of the item and a description of the item. The name of the item and the description can be included within structured data provided by each webpage (e.g., by each of first webpage 210 and second webpage 212).

In example aspects, the structured data can be information included within content (e.g., HTML content) of a webpage, for example, to describe the properties of item(s) within the web page. For example, if the HTML of a webpage provides for the display of a camera, structured data within the HTML can specify a brand name and a model number of the camera. More specifically, the HTML content of the webpage can specify values for different fields/attributes of an item within the webpage. Using the example of a camera in FIG. 2, the HTML of the webpage can specify that an item type is "camera," that the brand name of the camera is "ABC," and that the model number of the ABC camera is "123."

In this regard, the HTML can include constructs corresponding to fixed fields, such as fields for the types of items and the properties for the items. Examples of item types include, but are not limited to, objects (e.g., cameras, other types of devices), places and people. In example aspects, the different item types can be grouped and structured in a hierarchical manner, for example, where a camera may be included within the following hierarchy of items: object-electronic device-camera. Properties can be specified at any level of the hierarchy. For example, as noted above, the camera can include properties of a brand name (e.g., "ABC") and a model number (e.g., "123"), among other properties.

In the example of FIG. 2, item 214a/214b corresponds to a camera. First webpage 210 defines properties of item 214a using structured data from first webpage 210, and second webpage 212 defines properties of item 214b using structured data from second webpage 212. In this regard, items 214a and 214b can represent the same item (e.g., camera ABC 123), with first webpage 210 and second webpage 212 including structured data defining similar, but not necessarily identical, properties for item 214a/214b.

Each of first webpage 210 and second webpage 212 also include an interface 216 and 218, respectively, which allows for a user to socially endorse item 214a/214b. In the example of FIG. 2, interfaces 216 and 218 are depicted as "endorse" buttons. However, other interfaces can be used for allowing a user to socially endorse an item.

With reference to first webpage 210, when a user socially endorses item 214a via interface 216, data structure 202 (e.g., stored within data store 112b in FIG. 1) can be updated to include the social endorsement. For example, item 214a may correspond to item 3, as identified within item identifier column 204 of data structure 202. To match item 3 with item 214a, a comparison can be made between the description of item 3 (e.g., as described in column 206) and the structured data of item 214a as defined by first webpage 210. In particular, the description of item 3 (e.g., in column 206) may include several fields for item 3, and the values for these fields can be compared with the values of similar fields for the structured data of 214a.

In example aspects, an exact match between the values of the fields is not needed for a match. Rather, a threshold comparison value (e.g., a minimum threshold) may be sufficient to match item 214a with item 3 in data structure 202. For example, the threshold comparison value can be based on the similarity between individual fields and/or a total number of fields which match (or substantially match).

Regarding second webpage 212, when a user socially endorses item 214b via interface 218, data structure 202 can also be updated to include the social endorsement. In particular, a comparison (similar to the comparison for first webpage 210) is performed between the values in the structured data of item 214b as defined by webpage 212, and the description of item 3 as defined by data structure 202.

In example aspects, the endorsements for item 214a can be shown (e.g., in real-time, or within a predetermined time) when viewing item 214b, and the endorsements for item 214b can be shown (e.g., in real-time, or within a predetermined time) when viewing item 214a. In addition, this merged data can be used to provide better recommendations for items.

The indication of a social endorsement (e.g., via interface 216 or 218) can be obtained from log data, or in real-time. For example, user interactions (e.g., social endorsements) within a website (e.g., first webpage 210, second webpage 212) can be annotated in log data, and the log data can be accessed for the indication of social endorsements. Alternatively, or in addition, the indication of social endorsements can be received in real-time from a webpage (e.g., first webpage 210, second webpage 212) based on notifications from the respective webpage.

It should be noted that the above-described process for determining that item 214a on first webpage 210 corresponds to item 214b on second webpage 212 is one example of a matching algorithm. However, the subject technology is not limited to this algorithm, and other clustering algorithms can be used to determine if there is a match. For example, although the above-mentioned process describes comparing the structure data of an item (e.g., item 214a/214b) as defined by a webpage (e.g., first webpage 210, second webpage 212) with the description of the item within a data structure (e.g., data structure 202), it is possible for a comparison to be made between the structured data of the item between two webpages. In this example, the structured data of item 214a as defined by first webpage 210 can be compared with the structured data of item 214b as defined by second webpage 212, to determine if item 214a is the same as item 214b.

As noted above, data structure 202 is updated with social endorsements of items from one or more websites. In this regard, data structure 202 can include a field (e.g., social endorsement information column 208) that stores information for all endorsements, including, but not limited to, the identify of each user that socially endorsed the item, a timestamp for each endorsement, and a total number of endorsements. For example, the identify of a user can correspond to a user profile on a website which stores user profiles, including, but not limited to, a social networking service, a blog, or an ecommerce site.

Thus, data structure 202 stores plural item elements, where each item element includes an item identifier (e.g., from column 204), a description (e.g., from column 206) and social endorsement information (e.g., from column 208). The social endorsement information 208 is updated as new endorsements for items are made.

Accordingly, the subject disclosure provides for aligning the endorsements for an item from separate webpages (e.g., corresponding to different websites, or to webpages within the same website). In addition, even if the same item is referenced on multiple webpages with different descriptions based on structured data, social endorsements for the item can be aggregated and linked among the multiple webpages within a shared data structure (e.g., data structure 202).

In example aspects, the subject technology provides a representation of the social endorsement information (e.g., from column 208) for display within a webpage. For example, the webpage in which the user endorsed an item may request display of social endorsement information (e.g., total endorsements, endorsements from specific users, endorsements for users of a specific social circle, etc.) for an item. This information can be obtained (or calculated) from data structure 202.

Alternatively, or in addition, a representation of the social endorsement information can be provided for display in association with a user profile of a website (e.g., a social networking service). For example, a user within a social networking service can request the social endorsement information for all items which he/she has endorsed, or for the items endorsed by his/her contacts.

Although certain examples provided herein describe a user's information being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

Figure 3:
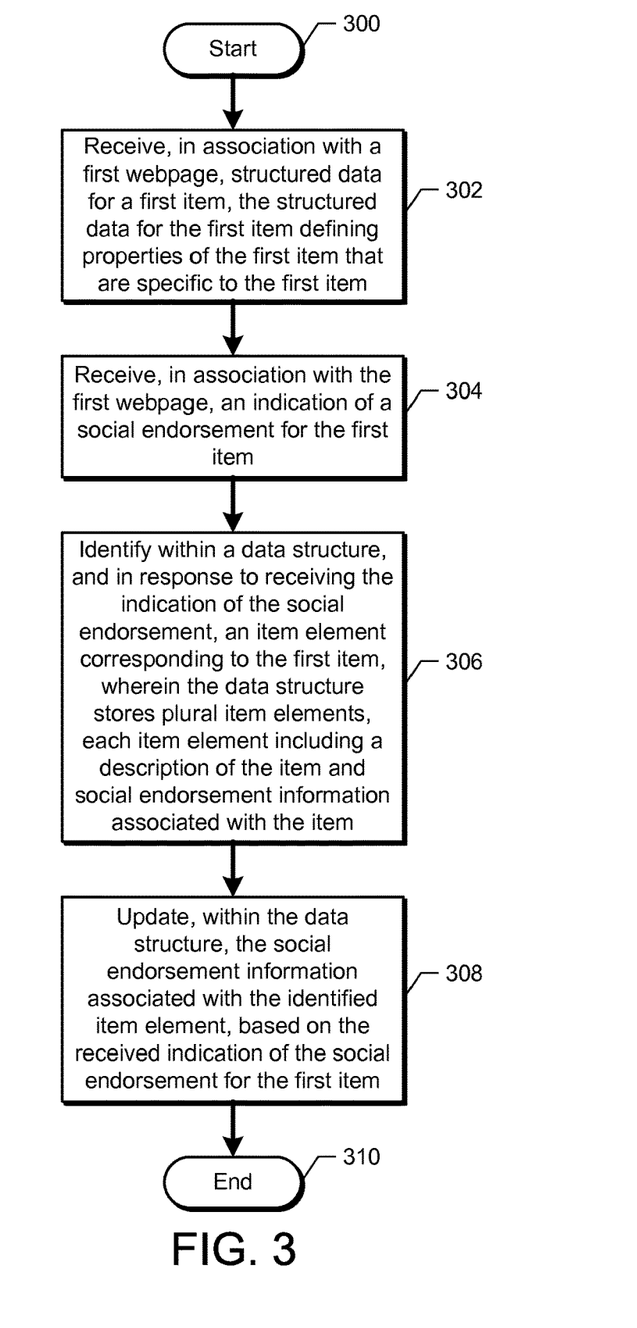
FIG. 3 illustrates an example process by which a social endorsement for an item is processed.

FIG. 3 illustrates an example process by which a social endorsement for an item is processed. Following start block 300, structured data for a first item is received in association with a first webpage at step 302. The structured data for the first item defines characteristics of the first item that are specific to the first item. For example, the structured data for the first item can include at least one of a brand name and a model number for the first item. The structured data can be defined by one or more HTML attributes of the first webpage.

At step 304, an indication of a social endorsement for the first item is received in association with the first webpage. The indication of the social endorsement can be received from log data which comprises annotations for user interactions associated with the first webpage. Alternatively, or in addition, the indication of the social endorsement can be received in real-time for the first webpage.

The first webpage can be configured to display a representation of the first item together with a user interface for socially endorsing the first item. The receiving the indication of the social endorsement can be based on user input via the user interface. The representation of the first item can be based on the structured data for the first item.

At step 306, in response to receiving the indication of the social endorsement, an item element corresponding to the first item is identified within a data structure. The data structure stores plural item elements, each item element including a description of the item and social endorsement information associated with the item. The identifying can include comparing the description of the item included within the item element with the structured data for the first item, and determining, based on the comparison, that the item element meets a threshold comparison value with the first item.

At step 308, the social endorsement information associated with the identified item element is updated within the data structure, based on the received indication of the social endorsement for the first item. The process then ends at end block 310.

In example aspects, structured data for a second item can be received in association with a second webpage, the structured data for the second item defining properties of the second item that are specific to the second item. In example aspects, the structured data for the first item and the structured data for the second item are not identical to each other. An indication of a social endorsement for the second item can be received in association with the second webpage. Based on the structured data for the second item, and in response to receiving the indication of the social endorsement for the second item, a determination can be made that the second item corresponds to the identified item element corresponding to the first item. The determination can be made using a clustering algorithm based on the structured data for the second item and at least one of the structured data for the first item or the description of the item included within the item element, to determine that the second item corresponds to the identified item element corresponding to the first item. The social endorsement information associated with the identified item element ca be updated within the data structure, based on the received indication of the social endorsement for the second item.

A representation of the social endorsement information can be provided for display within the first webpage. A request for the social endorsement information can be received in association with the first web page, and the representation can be provided for display within the first webpage in response to the received request. Alternatively, or in addition, a representation of the social endorsement information can be provided for display in association with a user profile of a social networking service.

Figure 4:
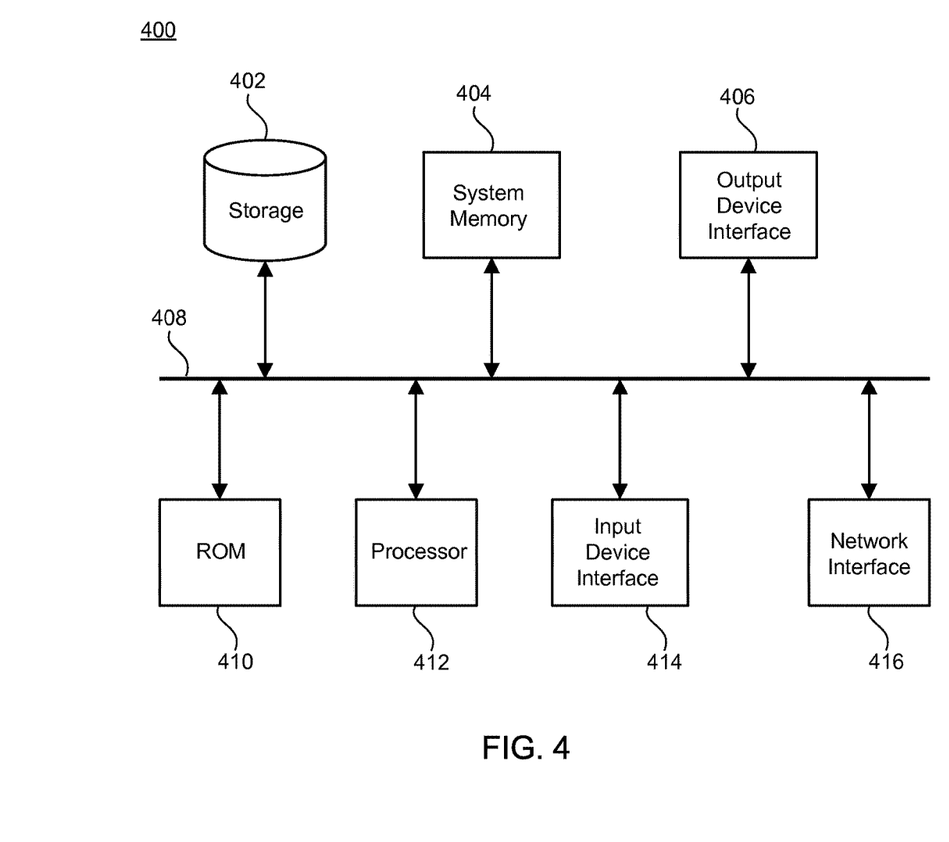
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for processing a social endorsement for an item in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method of processing a social endorsement for an item, the method comprising:

receiving, in association with a first webpage, first structured data for a first item, the first structured data defining properties of the first item that are specific to the first item and the first webpage;

receiving, in association with the first webpage, an indication of a first social endorsement for the first item;

identifying within a data structure located remote from the first webpage, and in response to receiving the indication of the first social endorsement, an item element corresponding to the first item, wherein the data structure stores plural item elements, each item element comprising social endorsement information for a respective item;

updating, in response to identifying the item element, social endorsement information for the first item in the identified item element based on the first social endorsement;

receiving, in association with a second webpage, second structured data for a second item, the second structured data defining properties of the second item that are specific to the second item and the second webpage, the first structured data and second structured data having different data structures from each other and the data structure;

receiving, in association with the second webpage, an indication of a second social endorsement for the second item;

determining, based on receiving the indication of the second social endorsement for the second item, that the second item corresponds to the identified item element;

updating, in response to determining that the second item corresponds to the identified item element, the social endorsement information for the first item in the identified item element based on the second social endorsement; and providing for display the updated social endorsement information for the first item, including a representation based on the first social endorsement and the second social endorsement.

2. A machine-implemented method of processing a social endorsement for an item, the method comprising:

receiving, in association with a first webpage, first structured data for a first item, the first structured data defining properties of the first item that are specific to the first item and the first webpage;

receiving, in association with the first webpage, an indication of a first social endorsement for the first item;

identifying within a data structure located remote from the fist webpage, and in response to receiving the indication of the first social endorsement, an item element corresponding to the first item, wherein the data structure stores plural item elements, each item element comprising social endorsement information for a respective item, the first structured data and the data structure having different data structures from each other;

updating, in response to identifying the item element, social endorsement information for the first item in the identified item element based on the first social endorsement; and providing for display the updated social endorsement information for the first item, including a representation based on the first social endorsement.

3. The method of claim 2, wherein the identifying comprises:

comparing a description of the item included within the identified item element with one or more properties of the first structured data; and determining, based on the comparison, that the identified item element and the first structured data satisfy a predetermined threshold level of similarity with respect to the first item.

4. The method of claim 2, further comprising:

receiving, in association with a second webpage, second structured data for a second item, the second structured data defining properties of the second item that are specific to the second item and the second webpage, the first structured data and second structured data having different data structures from each other and the data structure;

receiving, in association with the second webpage, an indication of a second social endorsement for the second item;

determining, based on receiving the indication of the second social endorsement for the second item, that the second item corresponds to the identified item element; and updating, in response to determining that the second item corresponds to the identified item element, the social endorsement information for the first item in the identified item element based on the second social endorsement.

5. The method of claim 4, wherein the determining comprises using a clustering algorithm based on the second structured data and at least one of the first structured data or a description of the item included within the identified item element, to determine that the second item corresponds to the identified item element corresponding to the first item.

6. The method of claim 2, wherein the first webpage is configured to display a representation of the first item together with a user interface for socially endorsing the first item.

7. The method of claim 6, wherein the receiving the indication of the first social endorsement is based on user input via the user interface.

8. The method of claim 6, wherein the representation of the first item is based on the first structured data.

9. The method of claim 2, further comprising:

providing a representation of the updated social endorsement information for display within the first webpage.

10. The method of claim 9, further comprising:

receiving, in association with the first web page, a request for the updated social endorsement information, wherein the providing the representation for display within the first webpage is in response to the received request.

11. The method of claim 2, further comprising:

providing a representation of the updated social endorsement information for display in association with a user profile of a social networking service.

12. The method of claim 2, wherein the first structured data comprises at least one of a brand name or a model number for the first item.

13. The method of claim 2, wherein the first structured data is defined by one or more HTML attributes of the first webpage.

14. The method of claim 2, wherein the indication of the first social endorsement is received from log data which comprises annotations for user interactions associated with the first webpage.

15. The method of claim 2, wherein the indication of the first social endorsement is received in real-time for the first webpage.

16. A system for processing a social endorsement for an item, the system comprising:

one or more processors; and a machine-readable medium comprising instructions stored therein, which when executed by the processors, cause the processors to perform operations comprising:

receiving, in association with a first webpage, first structured data for a first item, the first structured data defining properties of the first item that are specific to the first item and the first webpage, wherein the structured data is defined by one or more HTML attributes of the first webpage;

receiving, in association with the first webpage, an indication of a first social endorsement for the first item;

identifying within a data structure located remote from the first webpage, and in response to receiving the indication of the first social endorsement, an item element corresponding to the first item, wherein the data structure stores plural item elements, each item element comprising social endorsement information for a respective item, the first structured data and the data structure having different data structures from each other;

updating, in response to identifying the item element, social endorsement information for the first item in the identified item element based on the first social endorsement; and providing for display the updated social endorsement information for the first item, including a representation based on the first social endorsement.

17. The system of claim 16, wherein the identifying comprises:

comparing a description of the item included within the identified item element with one or more properties of the first structured data; and determining, based on the comparison, that the identified item element and the first structured data satisfy a predetermined threshold level of similarity with respect to the first item.

18. The system of claim 16, wherein the first webpage is configured to display a representation of the first item together with a user interface for socially endorsing the first item.

19. The system of claim 18, wherein the receiving the indication of the social endorsement is based on user input via the user interface.

20. The system of claim 16, wherein the first structured data is defined by one or more HTML attributes of the first webpage.

* * * * *